Figure 1:
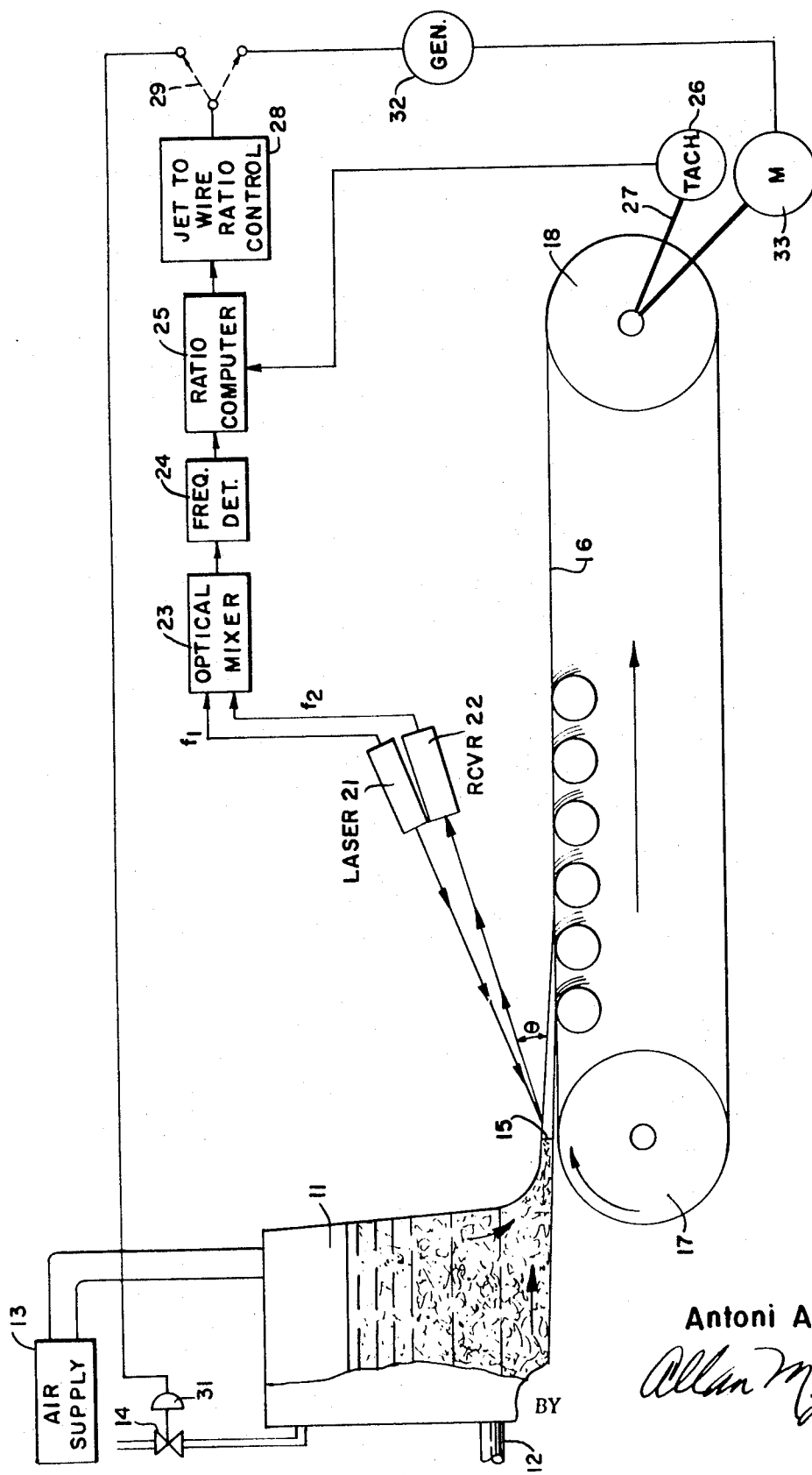

United States Patent

[11] 3,620,914

| [72] | Inventor | Antoni A. Rocheleau<br>Columbus, Ohio |
|---|---|---|
| [21] | Appl. No. | 634,566 |
| [22] | Filed | Apr. 28, 1967 |
| [45] | Patented | Nov. 16, 1971 |
| [73] | Assignee | Industrial Nucleonics Corporation |

[54] HEADBOX JET VELOCITY MEASURING SYSTEM AND METHOD
17 Claims, 2 Drawing Figs.

[52] U.S. Cl. .................................................. 162/198,
162/259, 162/263
[51] Int. Cl. ........................................................ D21f 11/02
[50] Field of Search ............................................... 162/198,
259, 236; 356/102, 103, 104; 73/194; 235/151.1;
72/10

[56] References Cited
UNITED STATES PATENTS

| 2,909,660 | 10/1959 | Alexander ..................... | 162/259 |
|---|---|---|---|
| 3,293,120 | 12/1966 | Harman, Jr. et al. ........... | 162/259 X |
| 3,446,558 | 5/1969 | Seaton .......................... | 356/104 |
| 3,271,241 | 9/1966 | Mumme ......................... | 162/259 |
| 3,461,030 | 8/1969 | Keyes ............................ | 162/198 |
| 3,399,565 | 9/1968 | Schmaeng ..................... | 162/263 X |
| 3,464,887 | 9/1969 | Salomon ........................ | 162/263 |
| 3,490,689 | 1/1970 | Hart et al. ..................... | 235/151.1 |
| 3,344,632 | 5/1965 | Phillipson ...................... | 72/10 |

FOREIGN PATENTS

| 1,016,028 | 1/1966 | Great Britain |
|---|---|---|

*Primary Examiner*—Reuben Friedman
*Assistant Examiner*—T. A. Granger
*Attorneys*—Allan M. Lowe, William T. Fryer, III, C. Henry Peterson and James J. O'Reilly ABSTRACT: Disclosed is a system for measuring the velocity of a jet emerging from a headbox in a paper manufacturing system. Jet velocity is determined by measuring the Doppler shift frequency caused by the jet on a laser beam of coherent electromagnetic energy. The velocity of the jet is compared with the velocity of a Fourdrinier wire which receives the jet, whereby there is derived a signal for enabling a predetermined relative velocity between the jet and the wire to be automatically or manually maintained. The laser beam is scanned across the width of the jet to determine differences in the jet velocity as a function of width. Consistency of paper sheet basis weight is maintained by controlling the fiber liquid ratio of the mixture fed to the headbox in response to nuclear gauge measurements of the sheet.

INVENTOR
Antoni A. Rocheleau
BY Allan M. Lowe
ATTORNEY

HEADBOX JET VELOCITY MEASURING SYSTEM AND METHOD

The present invention relates generally to papermaking and more particularly to a system for measuring the velocity of a jet emerging from a slice in a headbox.

In the papermaking art, a high velocity, high pressure jet of liquid and pulp emerges from a slit or slice in a headbox. The jet is directed to a conveyor, referred to in the art as a Fourdrinier wire, which allows a relatively large percentage of the liquid in the jet to be separated from the fiber. The liquid fiber mixture emerging from the Fourdrinier wire is processed to provide the desired moisture properties of the paper sheet being manufactured.

The quality, such as formation, of the paper sheet being manufactured is determined primarily by the relative velocities of the jet emerging from the headbox and the Fourdrinier wire, while these velocities control basis weight as a secondary parameter. Depending upon the desired quality and to a limited extent basis weight of the paper being manufactured, the jet to wire velocity is generally anywhere in the range of 0.95 to 1.05. Because the jet-to-wire velocity ratio is one of the most important factors in determining the quality of the paper being manufactured, it is imperative that the ratio be accurately controlled.

Two techniques have generally been utilized in the prior art for controlling the jet-to-wire ratio. In the first technique, the basis weight of a virtually finished paper web is measured to derive an indication of whether the web characteristics correspond with the desired characteristics. If the paper web does not have the desired basis weight, the width of slice in the headbox is varied. The basis weight of the web after the slice adjustment has been made is again measured and if the web characteristics do not fall within the requirements of the desired sheet, further adjustments are made in the headbox pressure or slice width. After repeated measurements of the virtually finished product and numerous adjustments of the headbox parameters, the jet-to-wire velocity ratio is finally empirically established. In addition to requiring time and materials in initially setting up the machinery, the empirical prior art technique has the disadvantage of not being able to compensate readily for variations in the jet-to-wire velocity ratio as the process proceeds.

According to the second technique generally utilized in the art, the velocity of the jet emerging from the headbox slice is calculated from the equation:

$$V = C_v \sqrt{2gh} \quad (1)$$

where:
- $V$ is the velocity of the jet,
- $C_v$ is the coefficient of velocity discharge,
- $g$ is the acceleration constant, and
- $h$ is the head in the headbox.

Equation (1) is approximately correct for a vessel filled with a liquid of a given head and discharging through an orifice at velocity V. For the case of a papermaking system headbox discharging a jet of fluid onto a Fourdrinier wire through a slice orifice in response to fluid being continually fed to the headbox, equation (1) is in significant error. In a papermaking headbox, the jet velocity is determined, to a certain extent, by the velocity of stock fiber fed to or approaching the headbox, together with the theoretical head velocity. Measuring the velocity of the stock material as it approaches the headbox is frequently very difficult or sometimes impossible to accomplish. In certain instances, an approximate value of the stock material approach velocity to the headbox is made and this factor is included in the calculations. In other instances, no attempt is made to evaluate the approach velocity and that factor is not included in the calculation for jet relocity. Failure to include the stock material approach velocity or approximations thereof may result in an appreciable error of the true jet velocity, as the approach velocity of the stock material may be on the order of 1 foot per second.

A further disadvantage attendant with determining jet velocity by relying upon headbox head or pressure is that only the average velocity of the jet, across the entire slice width, is measured. It is well known, however, that the velocity of a jet emerging from a headbox is subject to variations from one slice region to another. Such variations are introduced because of: (1) disturbances in the headbox induced by differences in equipment included across the width of the headbox; and (2) uneven flow distribution of the fiber fluid mixture supplied to different portions of the headbox. These factors combine to produce differing pressures behind the slice, whereby uneven fluid flow from different segments of the slice occurs.

According to the present invention, difficulties in measuring the jet velocity emerging from the slice of a papermaking headbox are overcome by measuring the velocity directly. Direct measurement of the jet velocity is accomplished by directing a beam of coherent electromagnetic energy at the jet and measuring the Doppler shift caused by the jet velocity in the frequency of the electromagnetic energy. The beam of electromagnetic energy is preferably a coherent source of optical energy, such as a laser.

The velocity of the jet, as determined by the Doppler shift frequency principle, is compared with the velocity of the Fourdrinier wire to derive a control signal, whereby a constant jet-to-wire velocity ratio is maintained. Thereby, consistency in the quality and basis weight of the stock paper is derived without utilizing inaccurate measuring techniques of empirical, trial and error methods.

According to a further feature of the present invention, the velocity of the jet across the entire width of the slice is determined by scanning coherent electromagnetic energy across the width of the jet. Thereby, a measurement of the velocity at each point across the jet width is derived. In response to the localized jet velocity determination, slice adjustments can be made at different points across the headbox, whereby consistency of jet velocity across its entire width is established.

A further feature of the invention relates to controlling the quality and basis weight of the paper web in a primary, rather than secondary, manner. As indicated supra, jet-to-wire velocity ratio controls the paper quality primarily and basis weight secondarily. Basis weight is controlled primarily by the fiber-to-water ratio of the mixture fed to the headbox; a parameter which controls quality in an ancillary manner. According to the invention, basis weight and quality are both controlled directly by combining the wire-to-jet ratio control with a beta gauge basis weight measurement. In response to the basis weight measurement, the fiber consistency is varied to produce paper having precisely controlled characteristics.

It is, accordingly, an object of the present invention to provide a new and improved system for measuring the velocity of a jet of liquid and fiber emerging from the slice of a paper making headbox.

Another object of the present invention is to provide a system for directly measuring the velocity of a jet emerging from the headbox of a papermaking machine.

An additional object of the present invention is to provide a new and improved system and method for controlling the quality of paper during manufacture thereof.

A further object of the present invention is to provide a new and improved system for deriving a control signal indicative of the ratio of the velocities of a jet emerging from the slice of a papermaking headbox to the Fourdrinier wire.

Still another object of the present invention is to provide a system for determining the velocity of a fluid and fiber jet emerging from the slice of a headbox in a papermaking system at a plurality of points across the width of the jet.

Yet another object of the present invention is to provide a new and improved system and method for maintaining the quality of a paper web substantially constant across the entire web width in response to measuring the velocity of a jet emerging from the slice of a headbox.

Still an additional object of the invention is to provide a system for and method of controlling both basis weight and quality of a paper sheet on primary bases.

Figure 2:
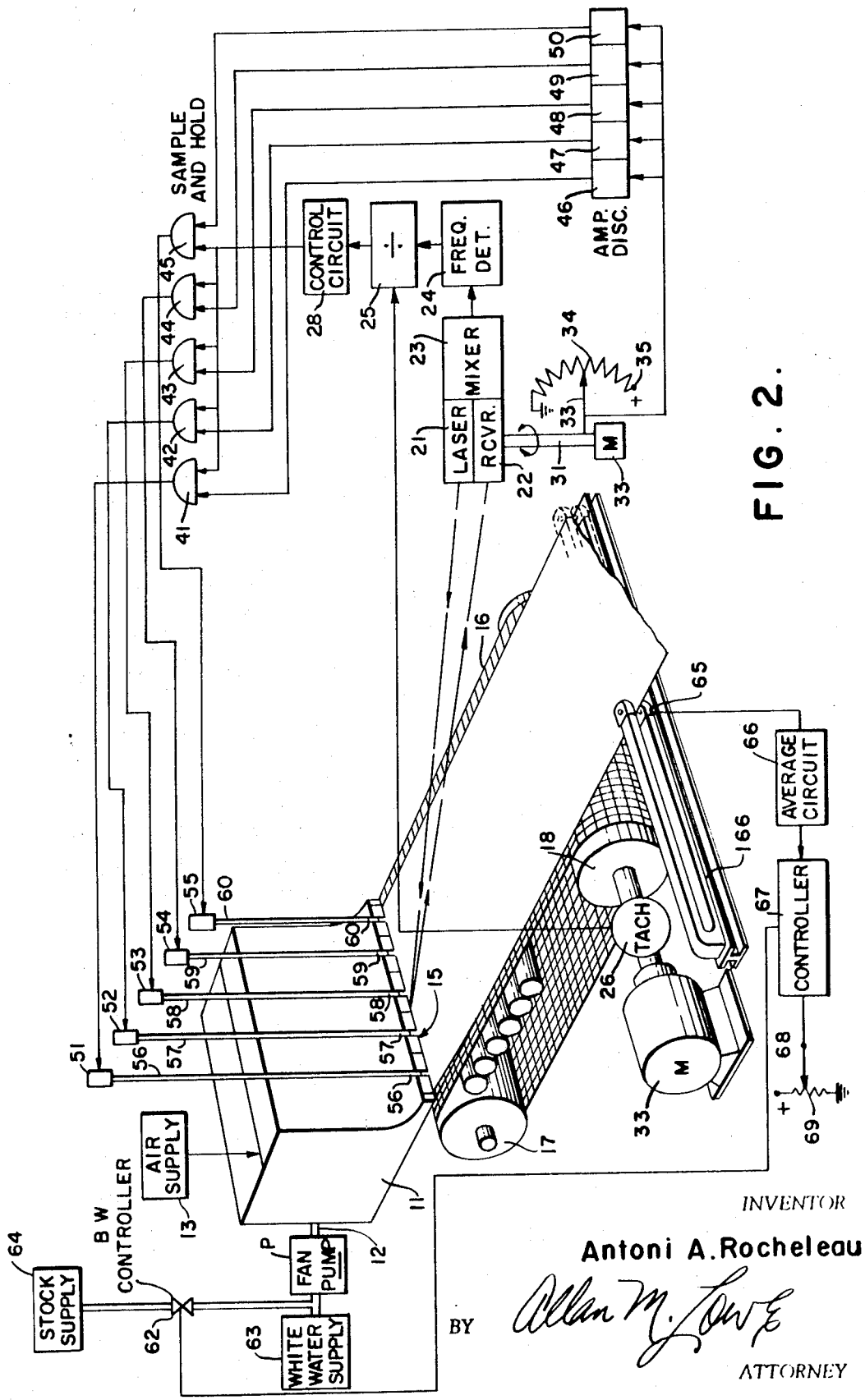

The above and still further objects, features and advantages of the present invention will become apparent upon consideration of the following detailed description of one specific embodiment thereof, especially when taken in conjunction with the accompanying drawings, wherein:

FIG. 1 is a side schematic view of one preferred embodiment of the control system of the present invention; and FIG. 2 is a top view of a modification of the system of FIG. 1, specifically designed for measuring localized jet velocities across the width of the slice.

Reference is now made to FIG. 1 of the drawings, wherein headbox 11 receives stock input, generally indicated by the discharge pipe 12. Headbox 11 is maintained under pressure in response to air from pressurized source 13 being continuously fed thereto. The air cushion pressure in headbox 11 is controlled by variably venting the air pressure therein to the atmosphere through valve 14. The air cushion established by source 13 and controlled by valve 14 forces stock 12 through headbox 11 to the mouth or slice 15, located at the bottom portion of the headbox. A jet of high velocity comprising liquid and paper fiber emerges from slice 15 and is directed toward moving conveyor or Fourdrinier wire 16. The jet emerging from headbox 11, through slice 15, is a reflecting liquid solid mixture, comprising approximately 99 percent water and a maximum of 1 percent paper fiber. The velocity of the jet may approach 3,000 feet per minute.

A liquid fiber film formed on Fourdrinier wire 16 in response to the jet from slice 15 is drained, to a certain extent, as the wire is translated between rollers 17 and 18. Draining is effected in a well-known manner since the Fourdrinier wire is generally porous and liquid is removed from its upper surface by gravity and suction along the length of wire 16 between rollers 17 and 18.

To measure the velocity of the fluid and fiber jet emerging from slice 15 of headbox 11, continuous wave laser 21, such as a helium-neon laser emitting coherent optical or electromagnetic energy at 11,530 A., is directed at the jet just downstream of slice 15. Optical energy from laser 21 is focused on the upper surface of the jet emerging from slice 15, whereby internal turbulence within the jet has a relatively small effect on the wavelength of the optical energy impinging thereon. A significant portion of the optical energy of laser source 21 focused on the upper surface of the jet is reflected from the jet because of the reflective property of the fluid. The velocity of the jet emerging from slice 15 modifies the wavelength of the coherent optical energy directed thereon by laser source 21 in accordance with the Doppler principle, whereby the wavelength of optical energy reflected from the milky film is decreased by an amount inversely proportional to the jet velocity at the point where the optical energy is focused thereon.

Energy is reflected off of the jet emerging from slice 15 at a predetermined angle $\theta$ and is directed back to approximately the same location as laser 21 to optical receiver 22. Since the angle $\theta$ and the wavelength of energy derived from laser 21 are known, the frequency of energy reflected from the jet and detected by optical receiver 22 can be related to the velocity of the jet as follows:

$$Cf = f_1(C + V_2 \cos \theta) \quad (3),$$

where:

$f_2$ is the frequency of the optical energy reflected from the jet and coupled to receiver 22, $f_1$ is the frequency of optical energy emitted by laser 21, $C$ is the velocity of light, and $V_2$ is the velocity of the jet.

By comparing the frequencies emitted by laser 21 and received by detector 22, a measurement of the jet velocity is derived. Comparing the frequencies of laser source 21 with the optical energy coupled to receiver 22 is accomplished by measuring the difference frequency of the two coherent optical rays directed toward and reflected from the jet. Measuring the difference frequency is accomplished by heterodyning the output signal of laser transmitter 21 with the signal coupled to receiver 22 in conventional optical mixer photocell 23. Optical mixer 23 drives a variable frequency AC electrical signal, the frequency of which is determined by the difference frequencies applied thereto.

The variable frequency output of optical mixer 23 is applied to frequency detector 24 that generates a variable DC voltage proportional to the AC frequency applied thereto by the mixer. The DC output signal of detector 24 is applied as one input to ratio computer 25, the other input of which is derived from DC tachometer generator 26, having an input shaft 27 coupled to roller 18 driving Fourdrinier wires 16. Tachometer generator 26 derives a variable amplitude DC signal commensurate with the translational velocity of Fourdrinier wire 16 whereby ratio computer 25 generates a signal proportional to the ratio of the velocities of the jet emerging from slice 15 and Fourdrinier wire 16. The DC output voltage generated by ratio computer 25 is applied to control circuit 28 that derives an AC or DC output signal, utilized for controlling the relative velocities of the jet emerging from headbox 11 and Fourdrinier wire 16. At the time the system is initially put into use for manufacturing a particular run of paper, a predetermined jet-to-wire velocity ratio is established in control circuit 28, which ratio is dependent upon the weight of the paper sheet desired to be manufactured as well as the speed at which it is manufactured. Control circuit 28 compares the preset ratio control input thereof with the output signal of ratio computer 25 to derive an error signal to indicate the departure of the actual to the desired jet-to-wire velocity ratio.

The error signal generated by control circuit 28 can be utilized for maintaining the jet-to-wire velocity ratio at the desired value by a plurality of different techniques. According to a first, and most simplified, technique, the value of the error signal is visually inspected and manual adjustments of mixing valve 14 or the rotational velocity of roller 18 are performed to maintain the error signal amplitude zero.

Automatic control means can also be utilized for changing the setting of venting valve 14 or the rotational velocity of roller 18. To these ends, the output of control circuit 28 is selectively applied through toggle switch 29 to controller 31 for bleed valve 14. With switch 29 connecting controller 31 to the output of control circuit 28, air bleed valve 14 is controlled to regulate the pressure of the air cushion in the headbox 11, thus reducing the error output signal of controller circuit 28 to substantially zero. In the alternative, the forward translational velocity of Fourdrinier wire 16 is altered by coupling the output of jet-to-wire ratio controller 28 through switch 29 to the input of generator 32. In response to the error signal from controller 28, generator 32 derives a signal that is coupled to motor 33 driving roller 18. The output of generator 32 activates motor 33 so that the rotational velocity of roller 18 is increased or decreased to reduce the error signal from control circuit 28 substantially to zero.

Reference is now made to FIG. 2 of the drawings wherein there is illustrated an embodiment of the invention wherein the jet velocity across the entire width of slice 15 is measured. In response to the measured jet velocity at a plurality of points across a width of slice 15, control signals are derived, whereby the jet velocity at each point across its entire width is the same predetermined percentage of the velocity of Fourdrinier wire 16.

To determine the velocity of the jet emerging from slice 15, across the entire width of the slice, laser source 21 and laser detector 22 are mounted on a common shaft 31. Shaft 31 is rotated, preferably at constant velocity, by motor 32. Shaft 31 carries slider 33 of potentiometer 34 that is excited with a reference voltage at terminal 35. Thereby, the voltage at tap 33 is indicative of the rotational position of shaft 31, and the point across the width of the slice 15 at which laser transmitter 21 is directed. Since the propagation time of coherent optical energy traversing the path from transmitter 21 to receiver 22 via the jet is virtually negligible compared to the time required for the laser beam to scan from one side of slice 15 to the other, the frequency of optical energy coupled back to receiver 22 is commensurate with the jet velocity at the point where laser 21 is directed.

Mounted with transmitter 21 and receiver 22 is an optical system including optical mixer 23, which derives a variable beat frequency indicative of the velocity of the jet emerging from slice 15. As transmitter 21 and receiver 22 are scanned across the width of the slice 15, i.e., from one side of the slice to the other, the frequency of the output signal derived by optical mixer 23 varies as a function of the jet velocity at the point irradiated by the laser optical energy. The variable frequency output signal generated by optical mixer 23 is coupled through frequency detector 24, which derives one input of ratio computer 25 in the same manner as indicated supra in conjunction with FIG. 1. As in the embodiment of FIG. 1, ratio computer 25 responds to a signal indicative of the translational velocity of Fourdrinier wire 16, to feed a variable DC signal to control circuit 28. Control circuit 28 derives an error signal proportional to the velocity of the jet emerging from slice 15, at each of the points across the slice, divided by forward velocity of Fourdrinier wire 16 minus the preset ratio established therein. The error signal derived from circuit 28 is applied in parallel to five sample and hold networks 41–45.

Sample and hold networks 41–45 are sequentially activated, one at a time, to respond to the output of control circuit 28 at five different positions across the width of slice 15. To this end, sample and hold circuits 41–45 are respectively connected to the outputs of amplitude discriminators 46–50, driven in parallel by the voltage at the slider 33 of potentiometer 34. Each of amplitude discriminators 46–50, is set to respond to a different voltage level derived from tap 33. In response to the voltage at tap 33 achieving the predetermined levels set into each of discriminators 46–50, the discriminator derives a relatively short duration pulse that is applied to the input of sample and hold circuits 41–45. The relatively short duration pulse is derived from amplitude discriminators 46–50 only as the voltage input thereof lies in a relatively narrow triggering region. If the voltage at tap 33 is less than or greater than the triggering region of a particular amplitude discriminator, no output pulse is derived from the particular discriminator. Thereby, each of amplitude discriminators 46–50 derives a single, relatively short duration pulse for each sweep of laser beam 21 across the width of slice 15 and the occurrence of the pulse is at a time coincident with a particular portion of the jet being irradiated by energy from laser 21. Hence, there is a one-to-one correspondence with the occurrence times of pulses derived by velocity discriminators 46–50 and the point where the jet velocity is being monitored across the jet width.

The relatively short duration output pulses of amplitude discriminators 46–50 are applied to sample and hold circuits 41–45, respectively, activating the sample and hold circuits to respond to the output voltage of controlling circuit 28. Thereby, as variations in the velocity at a particular point across the jet width occur between successive scans of transmitter 21 and receiver 22, the output of a particular sample and hold circuit varies. Sample and hold circuits 41–45 have storage circuits of sufficiently long duration to maintain substantially constant output voltages between successive activations of a particular sample and hold circuit for successive scans of transmitter 21 and receiver 22. The output voltage of each of sample and hold circuits 41–45 is thus a series of DC voltages that varies in steps at times coincident with the derivation of output pulses by amplitude discriminators 46–50.

The output voltages of sample and hold networks 41–45 are applied to slice screw controllers 51–55, respectively. Slice screw controllers 51–55 open and close slice screws 56–60, respectively to maintain the jet-to-wire velocity constant across the width of the jet regardless of pressure variations that occur in headbox 11 at different points along the width of slice 15.

Slice screws 56–60 are located across the bottom of headbox 11 at positions corresponding with the positional voltage indicating levels set in amplitude discriminators 46–50. Thereby, each of screws 56–60 is driven with an error signal from sample and hold networks 41–45 corresponding with the difference between the desired velocity ratio and the actual velocity ratio between the portion of the jet emerging from the screw and Fourdrinier wire 16. If a jam or other mishap should occur within headbox 11 at a particular point across the width thereof to reduce the jet velocity from slice 15, the jet pressure is decreased at that point by opening the mount of the slice correspondingly.

Maintaining the jet-to-wire velocity ratio constant across the width of slice 15 primarily controls the formation quality of the fiber constituting the finished paper sheet and secondarily affects the sheet basis weight. Basis weight is controlled primarily by the consistency of the fiber in the fiber water mixture entering headbox 11, as controlled by mixing valve 62. Depending upon the desired basis weight of the finished paper sheet, valve 62 allows fiber stock from source 64 having a consistency in the range of 2 to 5 percent to mix with white water from source 63, whereby the fiber-to-water volume ratio fed to headbox 11 by fan pump P is in the range of 0.3 to 1.5 percent by weight.

Control of mixing valve 62 is in response to profile basis weight measurements made with beta gauge 65, scanned by bracket 166 across the width of the sheet emerging from Fourdrinier wire 16. The profile signal derived by beta gauge 65 is fed to averaging circuit 66, the output of which is DC signal indicative of the average basis weight of the sheet across its width.

The output voltage of circuit 66 is utilized for controlling the consistency of fiber feed by valve 62 to headbox 11. Control of valve 62 can be manual by monitoring the output voltage of circuit 66 and adjusting the valve by hand until the output voltage provides an indication of the desired sheet basis weight. In the alternative, valve 62 can be controlled automatically by connecting the output of circuit 66 to one input of controller 67. The other input of controller 67 is a DC voltage from tap 68 of potentiometer 69, that is set for a desired value of basis weight. Controller 67 responds to the difference between the voltages at the output of circuit 66 and slider 68 to adjust valve 62 automatically. Valve 62 is controlled so that the output voltage of circuit 67 is reduced to zero in response to the sheet basis weight equaling the desired value, established by slider 68. As the sheet basis weight decreases below the desired value, controller 67 derives a control signal to increase the fiber consistency of the mixture fed by valve 62 to headbox 11, and vice versa if the basis weight is greater than the desired value.

Increasing the fiber consistency of the jet derived from headbox 11 has a secondary effect on the quality of the paper sheet formed. A further secondary effect introduced by the system and method of FIG. 2 is produced by controlling slice 15, viz, the basis weight of the sheet is controlled in an ancillary manner in response to the jet velocity emerging from the slice. These two secondary effects are combined with the primary basis weight and paper quality controls effected by valve 62 and slice 15, whereby paper of high consistency with regard to both basis weight and formation quality is manufactured.

While I have described and illustrated several specific embodiments of my invention, it will be clear that variations of the details of construction which are specifically illustrated and described may be made without departing from the true spirit and scope of the invention as defined in the appended claims.

I claim:

1. In a papermaking system, a headbox having a mouth for deriving a jet of fluid mixed with paper fiber, means directly responsive to the jet emerging from the headbox for sensing the velocity of the jet, said sensing means including means for directing a beam of energy towards the jet and for sensing a characteristic of the beam energy intercepted by the jet, and means coupled to said sensing means for deriving a signal responsive to the sensed jet velocity, said energy directing means including a source of coherent electromagnetic energy directed at said jet, said jet changing the frequency of said energy intercepted thereby by an amount proportional to said jet velocity to derive energy of another frequency, and means responsive to the energy intercepted by the jet for comparing the frequency of energy derived from said source with the another frequency.

2. In the system of claim 1, a conveyor for receiving said jet and carrying the fluid and fiber therein away from said mount, means for sensing the velocity of said conveyor to derive another signal, and means for comparing said two signals.

3. In the system of claim 2, further including means for controlling the relative velocities of said conveyor and jet in response to said means for comparing.

4. The system of claim 1 wherein said source comprises coherent optical energy.

5. In the system of claim 1, wherein said means for sensing includes a means for sensing the beam characteristic at a plurality of points across the width of the jet, and means for deriving a first signal indicative of the jet velocity at said points.

6. In the system of claim 5, a conveyor for receiving said jet and carrying the fluid and fiber therein away from said mouth, means for sensing the velocity of said conveyor to derive another signal, means for comparing said another signal separately with the first signal at each of said points, and means for controlling the relative velocities of said conveyor and said jet across the width thereof in response to said means for comparing.

7. A method of controlling the thickness of a paper web in manufacture comprising the steps of directing a beam of coherent electromagnetic energy at a jet of fluid and fiber emerging from a headbox slice, sensing a characteristic of the beam energy intercepted by the jet to derive an indication of the velocity of the jet emerging from the slice, measuring the velocity of Fourdrinier wire receiving said jet, comparing the sensed jet and measured wire velocities, and adjusting one of the velocities so that a predetermined relationship exists between the values of the sensed jet and measured wire velocities.

8. The method of claim 7 wherein the jet velocity is measured by directing a beam of coherent energy on the jet and sensing the Doppler shift frequency imposed on the beam by the jet.

9. The method of claim 7 wherein the jet velocity is measured across the width of the jet to derive the jet velocity at a plurality of points across the jet width, and in response to the measured jet velocity at the plural points adjusting the jet velocity at said points to achieve said relationship at said points.

10. The method of claim 9 further including the step of measuring the basis weight of the web being manufactured, and adjusting the consistency of a fiber liquid mixture fed to the headbox so that the measured basis weight has a predetermined value.

11. The method of claim 1 further including the step of scanning said beam across the width of the jet to derive the jet velocity at a plurality of points across the jet width, and in response to the measured jet velocity at the plural points adjusting the jet velocity at said points to achieve said relationship at said points.

12. The method of claim 7 further including the step of measuring the basis weight of the web being manufactured, and adjusting the consistency of a fiber liquid mixture fed to the headbox so that the measured basis weight has a predetermined value.

13. A method of measuring the velocity of a jet of fluid and fiber emerging from a headbox slice and having substantial width; comprising the steps of directing a beam of coherent electromagnetic energy on the jet and sensing the Doppler shift frequency imposed on the beam by the jet, and scanning said beam across the width of the jet, to derive an indication of the jet velocity at a plurality of points across the jet width.

14. The method of claim 13 wherein the beam is of optical coherent energy.

15. The method of claim 7 wherein the beam is of optical coherent energy.

16. The system of claim 1 wherein the beam is of optical coherent energy.

17. In the system of claim 5 wherein said means for sensing beam characteristics at a plurality of points across the width of the jet includes a source of a single beam of coherent energy of a predetermined frequency, and means for scanning said beam across the width of the jet.

* * * * *